(12) United States Patent
Masaki et al.

(10) Patent No.: US 9,505,195 B2
(45) Date of Patent: Nov. 29, 2016

(54) HEAT-SHRINKABLE LAMINATE FILM

(71) Applicant: ASAHI KASEI CHEMICALS CORPORATION, Tokyo (JP)

(72) Inventors: Daisuke Masaki, Tokyo (JP); Tohru Okuda, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/717,546

(22) Filed: May 20, 2015

(65) Prior Publication Data

US 2015/0336361 A1    Nov. 26, 2015

(30) Foreign Application Priority Data

May 22, 2014  (JP) ................................ 2014-106200
May 22, 2014  (JP) ................................ 2014-106201

(51) Int. Cl.

| | |
|---|---|
| *B32B 27/08* | (2006.01) |
| *B32B 27/34* | (2006.01) |
| *B32B 27/30* | (2006.01) |
| *B32B 27/32* | (2006.01) |
| *B32B 7/00* | (2006.01) |
| *B32B 7/02* | (2006.01) |
| *B32B 7/04* | (2006.01) |
| *B32B 7/12* | (2006.01) |
| *B32B 27/06* | (2006.01) |
| *B32B 27/28* | (2006.01) |

(52) U.S. Cl.
CPC ................ *B32B 27/08* (2013.01); *B32B 7/00* (2013.01); *B32B 7/02* (2013.01); *B32B 7/04* (2013.01); *B32B 7/12* (2013.01); *B32B 27/06* (2013.01); *B32B 27/28* (2013.01); *B32B 27/30* (2013.01); *B32B 27/306* (2013.01); *B32B 27/32* (2013.01); *B32B 27/34* (2013.01); *B32B 2307/30* (2013.01); *B32B 2307/7242* (2013.01); *B32B 2307/7244* (2013.01); *B32B 2307/732* (2013.01); *B32B 2307/736* (2013.01); *B32B 2439/70* (2013.01); *Y10T 428/31757* (2015.04); *Y10T 428/31913* (2015.04)

(58) Field of Classification Search
None
See application file for complete search history.

(56) References Cited

U.S. PATENT DOCUMENTS

| | | | |
|---|---|---|---|
| 4,729,476 A * | 3/1988 | Lulham .............. | A22C 13/0013 206/484.2 |
| 6,045,882 A * | 4/2000 | Sandford ................ | B32B 27/32 264/514 |
| 6,352,785 B1 | 3/2002 | Hanada et al. | |
| 6,852,806 B2 * | 2/2005 | Sasagawa ................. | C08F 8/04 428/500 |
| 2004/0039128 A1 | 2/2004 | Sasagawa et al. | |
| 2009/0017245 A1 * | 1/2009 | Forloni ................. | B29C 55/023 428/35.7 |
| 2009/0061245 A1 * | 3/2009 | Umeda ................... | B32B 27/32 428/483 |
| 2009/0208717 A1 | 8/2009 | Enzinger et al. | |
| 2010/0279133 A1 * | 11/2010 | Kamikage ............... | B32B 27/32 428/483 |
| 2013/0224412 A1 * | 8/2013 | Muta ..................... | B32B 27/302 428/35.7 |

FOREIGN PATENT DOCUMENTS

| | | |
|---|---|---|
| EP | 2116371 A1 | 11/2009 |
| JP | S58-8644 A | 1/1983 |
| JP | H07-027839 U | 5/1995 |
| JP | 2000-117872 A | 4/2000 |
| JP | 2008-545558 A | 12/2008 |
| JP | 2013-10199 A | 1/2013 |
| KR | 100503709 B1 | 7/2005 |
| KR | 20090100451 A | 9/2009 |

* cited by examiner

*Primary Examiner* — Tahseen N Khan
(74) *Attorney, Agent, or Firm* — Greenblum & Bernstein, P.L.C.

(57) ABSTRACT

A heat-shrinkable laminate film includes layer (A) and layer (B) laminated via an interface having an interlayer strength of ≤0.5 N/15 mm, in which layer (A) has at least a substrate layer containing a polypropylene-based resin, layer (B) has at least a seal layer containing a polyethylene-base resin, and any of the following is satisfied: (1) the difference in heat shrinkage rate between layer (A) and layer (B) is ≤10% at 100° C., and the laminate film includes a gas barrier layer containing a saponified ethylene-vinyl alcohol copolymer and has an oxygen transmission rate of ≤60 cc/m²·day·atm; and (2) the difference in heat shrinkage rate between layer (A) and layer (B) is ≤20% at 100° C., and the heat-shrinkable laminate film includes a gas barrier layer containing an aromatic polyamide-based copolymer and has an oxygen transmission rate of ≤60 cc/m²·day·atm.

12 Claims, No Drawings

HEAT-SHRINKABLE LAMINATE FILM

CROSS-REFERENCE TO RELATED APPLICATIONS

This application claims priority to and the benefit of Japanese Patent Application Nos. 2014-106200 and 2014-106201, both filed on May 22, 2014, the entire contents of which are incorporated herein by reference.

TECHNICAL FIELD

This disclosure relates to heat-shrinkable laminate films that are suitable for packaging by packaging machinery and for use mainly in the field of food packaging, in which gas barrier properties are required.

BACKGROUND

Packaging methods for covering food products include, for example, home-use wrap packaging, overwrap packaging, twist wrapping, bag packaging, skin packaging, pillow shrink packaging, stretch packaging, and top seal packaging. In particular, continuous packaging machines enabled to handle pillow shrink packaging and top seal packaging are widely used because of their ability for high speed packaging and the quality of finished products.

Moreover, for environmental considerations, a growing trend of reducing waste, such as food waste from supermarkets, convenience stores, and the like, has lead to an increased focus on gas pack packaging for long-term storage and room-temperature storage of food products. Gas pack packaging is a tool that delivers long-term storage by filling a container with a gas such as nitrogen or carbon dioxide to inhibit the growth of bacteria and the like. Suitable films for gas pack packaging are gas barrier films with low oxygen permeability. As such gas barrier films, films that are formed by lamination of a resin with barrier properties and a polyolefine-based resin with low-temperature sealing properties are known.

For example, JP2000117872A (PTL 1) describes a film that has at least one layer made of a resin composition having gas barrier properties, balances gas barrier properties and drawability, and exhibits excellent heat-shrinkable properties. In addition, JPS588644A (PTL 2) describes a technique relating to a heat-shrinkable multilayer plastic film that provides a heat-sterilizable package with good gas barrier properties. Moreover, JP2008545558A (PTL 3) describes a technique directed to a multilayer film that has a biaxially oriented film formed by a layer of crystallizable polyolefin and at least one coextruded layer of ethylene-vinyl alcohol copolymers, and that is given sufficient mechanical properties.

CITATION LIST

Patent Literature

PTL 1: JP2000117872A
PTL 2: JPS588644A
PTL 3: JP2008545558A

However, the techniques of PTL 1 and PTL 3 have the problem of susceptibility to heat seal failures, such as fusing of a heat seal bar to the film or roughening of surface at the time of sealing, since the outer layers are formed by substantially the same resin and the surface which the seal bar contacts does not have heat resistance. Although the technique of PTL 2 provides good sealing properties since the outer layers are formed from different resins, it has the problem that film conveyance failures occur frequently due to warping of the resulting film when packaging products such as food products using packaging machinery.

It could thus be helpful to provide a heat-shrinkable laminate film that exhibits stable heat sealing properties, is less prone to warping, and has excellent barrier properties.

SUMMARY

We thus provide:
(1) A heat-shrinkable laminate film comprising a layer (A) and a layer (B) laminated via an interface having an interlayer strength of 0.5 N/15 mm or lower, wherein the layer (A) comprises at least a substrate layer containing a polypropylene-based resin, the layer (B) comprises at least a seal layer containing a polyethylene-base resin, and any of the following conditions 1) and 2) is satisfied:
1) the difference in heat shrinkage rate between the layer (A) and the layer (B), when peeled at the interface, either in machine direction (MD) or transverse direction (TD), is 10% or less at 100° C., and the heat-shrinkable laminate film comprises a gas barrier layer containing a saponified ethylene-vinyl alcohol copolymer and has an oxygen transmission rate of 60 cc/m$^2$·day·atm or lower at 23° C., 65% RH; and
2) the difference in heat shrinkage rate between the layer (A) and the layer (B), when peeled at the interface, either in machine direction (MD) or transverse direction (TD), is 20% or less at 100° C., and the heat-shrinkable laminate film comprises a gas barrier layer containing an aromatic polyamide-based copolymer and has an oxygen transmission rate of 60 cc/m$^2$·day·atm or lower at 23° C., 65% RH.
(2) The heat-shrinkable laminate film according to aspect (1) above, wherein the heat-shrinkable laminate film comprises a gas barrier layer containing an aromatic polyamide copolymer, and has a total-layer heat shrinkage rate in the machine direction of 20% or more at 140° C.
(3) The heat-shrinkable laminate film according to aspect (1) or (2) above, wherein the substrate layer, a first adhesive layer containing a modified polyolefin-based resin, a gas barrier layer containing an aromatic polyamide-based copolymer, a second adhesive layer containing a modified polyolefin-based resin, and the seal layer are laminated in the stated order, and either an interface between the first adhesive layer and the gas barrier layer, or an interface between the gas barrier layer and the second adhesive layer has an interlayer strength of 0.5 N/15 mm or lower.
(4) The heat-shrinkable laminate film according to any one of aspects (1) to (3) above, wherein the second adhesive layer has a melting point higher than that of the first adhesive layer by 15° C. or more.
(5) The heat-shrinkable laminate film according to aspect (1) above, wherein the heat-shrinkable laminate film comprises a gas barrier layer containing a saponified ethylene-vinyl alcohol copolymer, and has a total-layer heat shrinkage rate in the machine direction of 30% or more at 100° C.
(6) The heat-shrinkable laminate film according to aspect (1) or (5) above, wherein the substrate layer, a first adhesive layer containing a modified polyolefin-based resin, a gas barrier layer containing a saponified ethylene-vinyl alcohol copolymer, a second adhesive layer containing a modified polyolefin-based resin, and the seal layer are laminated in the stated order, and either an interface between the first adhesive layer and the gas barrier layer, or an interface between the gas barrier layer and the second adhesive layer has an interlayer strength of 0.5 N/15 mm or lower.

(7) The heat-shrinkable laminate film according to any one of aspects (1), (5), and (6) above, wherein the first adhesive layer has a melting point equal to or lower than that of the second adhesive layer.

(8) The heat-shrinkable laminate film according to any one of aspects (1) to (7) above, wherein each of the resins other than the gas barrier layer has a melting point of 170° C. or lower.

(9) The heat-shrinkable laminate film according to any one of aspects (1) to (8) above, wherein the difference in highest melting point between the resin making the substrate layer and the resin making the seal layer is 30° C. or less.

(10) The heat-shrinkable laminate film according to any one of aspects (1) to (9) above, wherein the heat-shrinkable laminate film has a total-layer heat shrinkage rate in the transverse direction of 5% or less at 60° C.

(11) The heat-shrinkable laminate film according to any one of aspects (1) to (10) above, wherein the heat-shrinkable laminate film has a total layer thickness of 25 µm or less.

(12) The heat-shrinkable laminate film according to aspects (1) to (11) above, wherein the heat-shrinkable laminate film has 5-mm or less warpage when allowed to stand for 1 hour at 23° C., 50% RH.

According to the disclosure, by using a layer containing a polypropylene-based resin as the substrate layer which a heat seal bar contacts, and a layer containing a polyethylene-based resin as the seal layer, it is possible to increase the difference in melting point between the substrate layer and the seal layer and to achieve stable heat sealing in a wider temperature range, resulting in reduced risk of sealing failure in automated packaging machines. In addition, our film has a layer (A) and a layer (B) laminated via an interface having an interlayer strength of 0.5 N/15 mm or lower, wherein the difference in heat shrinkage rate between the layer (A) and the layer (B), when peeled at the interface, is 10% or less at 100° C. in the case that the film comprises a gas barrier layer containing a saponified ethylene-vinyl alcohol copolymer, or 20% or less in the case that the film comprises a gas barrier layer containing an aromatic polyamide-based copolymer. This configuration may thus inhibit the occurrence of warping and provide improved handling properties during the packaging process. Further, our film is suitable for packaging and gas pack packaging of strong-smelling food products, since it has a gas barrier layer containing a saponified ethylene-vinyl alcohol copolymer or an aromatic polyamide-based copolymer.

DETAILED DESCRIPTION

An embodiment of our film will be described in detail below. Note that our film is not limited to the disclosed embodiment and that many modifications and variations are possible without departing from the scope and spirit of the disclosure.

The heat-shrinkable laminate film according to this embodiment has an interface having an interlayer strength of 0.5 N/15 mm or lower, at which interface a layer (A) and a layer (B) can be peeled away from each other. The layer (A) includes at least a substrate layer containing polypropylene and the layer (B) has at least a seal layer containing polyethylene. In the heat-shrinkable laminate film, the substrate layer and the seal layer are preferably located at outermost layers, respectively. In addition to the substrate layer and the seal layer, the heat-shrinkable laminate film may further include, for example, a gas barrier layer and an adhesive layer, which will be discussed later.

Examples of the layer structure of the heat-shrinkable laminate film include those listed below. The following layer structures make the effect disclosed herein more pronounced. Note that the symbol "//" represents an interface having an interlayer strength of 0.5 N/15 mm or lower, at which interface the layer (A) and the layer (B) can be peeled away from each other.

substrate layer//gas barrier layer/seal layer
substrate layer/gas barrier layer//seal layer
substrate layer//adhesive layer/gas barrier layer/seal layer
substrate layer/adhesive layer/gas barrier layer//seal layer
substrate layer/adhesive layer//gas barrier layer/adhesive layer/seal layer
substrate layer/adhesive layer/gas barrier layer//adhesive layer/seal layer Preferred layer configuration of each of the layers making the heat-shrinkable laminate film will be further described below.

[Layer (A)]

The layer (A) includes at least a substrate layer containing a polypropylene-based resin. In addition, the layer (A) may further include, for example, an adhesive layer imparting adhesive strength between layers and/or a gas barrier layer containing a saponified ethylene-vinyl alcohol copolymer or an aromatic polyamide copolymer.

[Layer (B)]

The layer (B) includes at least a seal layer containing a polyethylene-based resin. In addition, the layer (B) may further include, for example, an adhesive layer imparting adhesive strength between layers and/or a gas barrier layer containing a saponified ethylene-vinyl alcohol copolymer or an aromatic polyamide copolymer.

[Substrate Layer]

The substrate layer according to this embodiment is a layer that provides heat resistance to the heat-shrinkable laminate film and is preferably located at an outermost layer of the heat-shrinkable laminate film. The substrate layer may also serve as a drawing-backing layer during the production of the heat-shrinkable laminate film.

The substrate layer according to this embodiment contains a polypropylene-based resin, in an amount of preferably 50 mass % or more, more preferably 60 mass % or more, and even more preferably 70 mass % or more.

As the polypropylene-based resin, a propylene-only copolymer and/or a propylene-based copolymer may be preferably used, and examples thereof may include polypropylenes, propylene-α-olefin copolymers, and terpolymers of propylene, ethylene, and α-olefin.

The term "propylene-only copolymer" refers to a polymer that is obtained by polymerizing only propylene. As the polypropylene-based copolymer, a copolymer of propylene and at least one selected from ethylene or α-olefin having 4 to 20 carbon atoms is preferably used.

More preferred is a copolymer of propylene and at least one selected from ethylene or α-olefin having 4 to 8 carbon atoms.

Examples of α-olefins include ethylene, propylene, 1-butene, 1-pentene, 1-hexene, 1-octene, 4-methyl-1-pentene, 3-methyl-1-pentene, 1-decene, 1-dodecene, 1-tetradecene, 1-hexadecene, 1-octadecene, and 1-eicosene. These examples may be used alone or in combination of two or more.

As the propylene-α-olefin copolymer, a copolymer of propylene and at least one comonomer selected from ethylene comonomer, butene comonomer, hexene comonomer, or octene comonomer is commonly and readily available and is preferably used.

The polypropylene-based resin may be obtained by polymerization using a well-known catalyst, such as a single-site catalyst and a multi-site catalyst, preferred is a single-site catalyst from the perspective of obtaining better transparency.

The polypropylene-based resin may be a resin obtained by polymerization using a catalyst such as Ziegler-Natta catalyst, or a resin obtained by polymerization using a metallocene-based catalyst or the like. That is, for example, syndiotactic polypropylene and isotactic polypropylene may also be used as the polypropylene-based resin.

As the polypropylene-based resin, it is also possible to use a polypropylene-based resin whose crystalline/amorphous structure (morphology) is controlled with nanometer precision.

Polypropylene-based resins may be used alone or in combination. A combination of polypropylene and a propylene-α-olefin copolymer is preferred because it tends to reduce crystallinity of the substrate layer and provide improved heat-shrinkable properties.

The substrate layer may contain a component other than the polypropylene-based resin. For example, the substrate layer may also contain any additive, without compromising its properties, such as a thermoplastic, a surfactant, an anti-blocking agent, an antistatic agent, a lubricant, a plasticizer, an antioxidant, an ultraviolet absorber, a colorant, and an inorganic filler.

To impart anti-fogging properties to the heat-shrinkable laminate film according to this embodiment, it is possible to add a glycerin-based fatty acid ester as a surfactant to the substrate layer. When a glycerin-based fatty acid ester is added, the content is preferably 0.1 mass % to 5.0 mass % based on the substrate layer.

Examples of the glycerin-based fatty acid ester include a mono-, di-, tri-, or poly-fatty acid ester of glycerin, and a mono-, di-, tri-, tetra-glycerin ester of a saturated or unsaturated fatty acid having 8 to 18 carbon atoms. Among these, from the perspective of reduced risk of compromising sliding properties or optical properties of the resulting film, preferred are those mainly composed of di-glycerin oleate, di-glycerin laurate, glycerin stearate, glycerin monooleate, or a mixture thereof. An ethylene oxide adduct may be further added to reduce the surface tension of water droplets, thereby imparting good anti-fogging properties. Examples of the ethylene oxide adduct include polyoxyethylene alkyl ether.

[Seal Layer]

The seal layer according to this embodiment is a layer that provides heat sealing properties to the heat-shrinkable laminate film and is preferably located at an outermost layer of the heat-shrinkable laminate film. The seal layer may also serve as a drawing-backing layer during the production of the heat-shrinkable laminate film.

Examples of the polyethylene-based resin making the seal layer according to this embodiment include polyethylenes and ethylene-α-olefin copolymers.

Examples of polyethylenes include high-density polyethylene, middle-density polyethylene, low-density polyethylene (LDPE), and ultra-low-density polyethylene. Examples of ultra low density polyethylene include linear very- or ultra-low-density polyethylene (called "VLDPE" or "ULDPE").

Polyethylenes can be classified by density under JIS K 6922. Specifically, a polyethylene having a density of 0.942 $g/cm^3$ or higher is called high-density polyethylene, a polyethylene having a density of 0.930 $g/cm^3$ or higher and lower than 0.942 $g/cm^3$ is called middle-density polyethylene, a polyethylene having a density of 0.910 $g/cm^3$ or higher and lower than 0.930 $g/cm^3$ is called low-density polyethylene, and a polyethylene having a density of lower than 0.910 $g/cm^3$ is called ultra-low-density polyethylene.

The term "ethylene-α-olefin copolymer" refers to a copolymer of ethylene and at least one selected from the aforementioned α-olefins.

Additionally, in the aforementioned ethylene-α-olefin copolymer, the proportion of α-olefins (charged monomer basis) in the total monomers making the copolymer is preferably 5 mass % to 30 mass % of a soft copolymer.

As the aforementioned ethylene-α-olefin copolymer, a copolymer of ethylene and at least one comonomer selected from propylene comonomer, butene comonomer, hexene comonomer, or octene comonomer is commonly and readily available and is preferably used.

The polyethylene-based resin may be obtained by polymerization using a well-known catalyst, such as a single-site catalyst and a multi-site catalyst; preferred is a single-site catalyst from the perspective of obtaining better transparency.

From the perspective of obtaining even better heat sealing properties at low temperature, the polyethylene-based resin preferably has a density of 0.860 $g/cm^2$ to 0.925 $g/cm^2$, more preferably 0.870 $g/cm^2$ to 0.920 $g/cm^2$, and still more preferably 0.880 $g/cm^2$ to 0.915 $g/cm^2$. As the density of the polyethylene-based resin decreases, heat sealing properties at low temperature tend to improve. Heat sealing properties have a tendency to improve when the density is 0.925 $g/cm^2$ or lower.

As the polyethylene-based resin, it is also possible to use a polypropylene-based resin whose crystalline/amorphous structure (morphology) is controlled with nanometer precision.

Polyethylene-based resins may be used alone or in combination, a combination of polyethylene and an ethylene-α-olefin copolymer is preferred because it tends to reduce crystallinity of the substrate layer and provide improved heat-shrinkable properties.

The seal layer may also contain components other than the polyethylene-based resin. For example, the seal layer may also contain any additive, without compromising its properties, such as a thermoplastic, a surfactant, an anti-blocking agent, an antistatic agent, a lubricant, a plasticizer, an antioxidant, an ultraviolet absorber, a colorant, and an inorganic filler.

To impart anti-fogging properties to the heat-shrinkable laminate film according to this embodiment, it is possible to add the aforementioned glycerin-based fatty acid ester as a surfactant to the seal layer.

[Gas Barrier Layer]

A gas barrier layer according to this embodiment (hereinafter, simply referred to as "the gas barrier layer") is a layer that contains a saponified ethylene-vinyl alcohol copolymer or an aromatic polyamide-based copolymer and serves to improve the gas barrier properties of the heat-shrinkable laminate film.

In the gas barrier layer containing a saponified ethylene-vinyl alcohol copolymer, the saponified ethylene-vinyl alcohol copolymer has a melting peak temperature (hereinafter, "a melting point"), when measured in accordance with JIS-K-7210, of preferably 170° C. or lower, more preferably 165° C., and still more preferably 160° C. or lower.

The saponified ethylene-vinyl alcohol copolymer promotes, insofar as the melting point is 170° C. or lower, relaxation of molecular orientation at the time of heat shrinking process during packaging, and may thus provide good heat-shrinkable properties suitable for shrink packaging.

Note that the melting point corresponds to the temperature at the highest endothermic peak in a melting curve obtained by Differential Scanning calorimetry (DSC). If more than two melting peaks appear, it suffices for the highest melting peak temperature to be within the aforementioned numerical range (i.e., in this disclosure, the highest melting peak temperature is regarded as the melting point).

In addition, the crystallinity of the saponified ethylene-vinyl alcohol copolymer decreases with increasing ethylene content, which tends to provide good drawability. The ethylene content is preferably 30 mol % to 50 mol %, more preferably 33 mol % to 46 mol %, and still more preferably 36 mol % to 40 mol %. When the ethylene content is within the aforementioned range, it is possible to obtain a film that is excellent in drawability and gas barrier properties.

On the other hand, one or more types of aromatic polyamide-based copolymers may be used for the gas barrier layer containing an aromatic polyamide-based copolymer. The term "aromatic polyamide-based copolymer" means a crystalline nylon (polyamide) having an aromatic ring in the main chain, and specific examples thereof include meta-xylylene adipamide (MXD6Ny), a polycondensate of meta-xylylene diamine, adipic acid, and isophthalic acid, and so on. Aromatic polyamide-based copolymers are suitable for the material making the gas barrier layer, because they are excellent in gas barrier properties and smell barrier properties, good in strength such as pinhole resistance, drawability, moldability, and the like, as compared to aliphatic nylons such as nylon 6 and nylon 6/66, suppresses color change and deterioration of packed products caused by exposure to light, and has high rigidity. The content of the aromatic polyamide-based copolymer is preferably 80 mass % or more, and more preferably 90% or more, based on the resin making the gas barrier layer The gas barrier properties of the heat-shrinkable laminate film are determined by measuring oxygen transmission rate under the oxygen condition of 65% RH and with the measurement temperature of 23° C. From the perspective of ability to reduce oxygen transmission and suitability for gas pack packaging, the oxygen transmission rate upon the expiration of 3 hours from the start of the measurement is 60 cc/m$^2$·day·atm or lower, and preferably 50 cc/m$^2$·day·atm or lower. The heat-shrinkable laminate film having such gas barrier properties can sufficiently reduce oxygen transmission.

[Adhesive Layer]

An adhesive layer according to this embodiment (hereinafter, simply referred to as "the adhesive layer") may be, for example, a layer that is arranged between two layers low in adhesive strength to each other so as to adhere the layers together, and that may be formed of a resin composition containing a well-known adhesive resin.

As the adhesive resin, a modified polyolefin-based resin obtained by graft polymerization of a polyolefin-based resin and at least one selected from α,β-unsaturated carboxylic acid or its derivatives may be used.

As the modified polyolefin-based resin, a modified propylene-based resin or/and a modified polyethylene-based resin are preferable from the perspective of providing excellent adhesive properties and heat resistance. Preferred modified propylene-based resins are, for example, modified polymers obtained from graft copolymerization of polypropylene-based resins, such as polypropylenes, propylene-α-olefin copolymers, and tercopolymers of propylenes, ethylenes, and α-olefins with unsaturated carboxylic acids, such as maleic acid and fumaric acid, or their acid anhydrides, and more preferred are modified polymers obtained from graft copolymerization of polypropylenes, propylene-α-olefin copolymers, tercopolymers of propylenes, ethylenes, and α-olefins with maleic anhydrides. Preferred modified polyethylene-based resins are, for example, modified polymers obtained from graft copolymerization of polyethylene-based resins, such as polyethylene homopolymer, ethylene-propylene copolymer, and ethylene-α-olefin copolymer, with unsaturated carboxylic acids, such as maleic acid and fumaric acid, or their anhydrides, and more preferred are modified polymers obtained from graft copolymerization of ethylene-only copolymers, ethylene-propylene copolymers, or ethylene-α-olefin copolymers with maleic anhydrides.

This embodiment may one or more adhesive layers. For example, this embodiment may contain a first adhesive layer provided between a substrate layer and a gas barrier layer and a second adhesive layer provided between a gas barrier layer and a seal layer.

Adjustment of residual stress of the adhesive layer caused by molecular orientation may serve to inhibit the occurrence of warping and, furthermore, act as a drawing-backing layer during the production of the heat-shrinkable laminate film.

In the adhesive layer, modified polyolefin-based resins may be used alone or in combination. Additionally, to reduce crystallinity and improve heat-shrinkable properties, modified polyolefin-based resins and other thermoplastic(s) may be used in combination. As the other thermoplastic(s), for example, the aforementioned polypropylene-based resins and/or polyethylene-based resins may be used in combination.

The heat-shrinkable laminate film preferably has 5-mm or less warpage, more preferably 4 mm or less, and still more preferably 3-mm or less warpage, when allowed to stand for 1 hour at 23° C., 50% RH. The heat-shrinkable laminate film thus configured may provide good handling properties during the packaging process.

To keep warpage within the aforementioned range when the heat-shrinkable laminate film has a barrier layer containing a saponified ethylene-vinyl alcohol copolymer, it is possible to inhibit the occurrence of warpage of the heat-shrinkable laminate film by controlling the difference in heat shrinkage rate between the layer (A) and the layer (B), when peeled at an interface having an interlayer strength of 0.5 N/15 mm or lower, to be 10% or less, preferably 7% or less, and still more preferably 5% or less, at 100° C.

In addition, the difference in heat shrinkage rate between the layer (A) and the layer (B) is preferably 10% or less at 100° C. either in machine direction (hereinafter, also referred to as "MD") or transverse direction (hereinafter, also referred to as "TD"), and is more preferably 10% or less both in the machine direction and transverse direction.

To keep warpage within the aforementioned range when the heat-shrinkable laminate film has a barrier layer containing an aromatic polyamide-based copolymer, it is possible to inhibit the occurrence of warpage of the heat-shrinkable laminate film by controlling the difference in heat shrinkage rate between the layer (A) and the layer (B), when peeled at an interface having an interlayer strength of 0.5 N/15 mm or lower, to be 20% or less, preferably 15% or less, and still more preferably 10% or less, at 100° C. In addition, the difference in heat shrinkage rate between the layer (A)

and the layer (B) is preferably 20% or less at 100° C. either in machine direction (hereinafter, also referred to as "MD") or transverse direction (hereinafter, also referred to as "TD"), and is more preferably 20% or less both in the machine direction and transverse direction.

In the case of a laminate as the heat-shrinkable laminate film, a variety of forces are applied to the molten resin during the molding process and residual stress may remain in the molded product accordingly. Residual stress corresponds to strain caused by molecular orientation and strain caused by resilient deformation of molecules at the time of solidification, and varies depending on resin compositions, molding conditions, and the like. Here, for example, conventional laminate films require different molding processes such as hot drawing and dry lamination, which causes an imbalance in residual stress of layers, with the result that the laminate film may suffer warpage as a whole.

In contrast, the heat-shrinkable laminate film having the layer (A) and the layer (B) with a small difference in heat shrinkage rate less often causes an imbalance in residual stress among layers. It is thus possible to sufficiently inhibit the occurrence of warpage of the heat-shrinkable laminate film as a whole.

In this embodiment, when the difference in highest melting point between the resin making the substrate layer and the resin making the seal layer is 30° C. or lower, the difference in heat shrinkage rate between the layer (A) and the layer (B) may be reduced. When the heat-shrinkable laminate film has a barrier layer containing a saponified ethylene-vinyl alcohol copolymer, the difference in melting point is more preferably 25° C. or less, and still more preferably 20° C. or less. In addition, when the heat-shrinkable laminate film has a gas barrier layer containing an aromatic polyamide-based copolymer, the difference in melting point is more preferably 28° C. or less, and still more preferably 25° C. or less. The laminate thus configured less often causes an imbalance in residual stress among layers. It is thus possible to sufficiently inhibit the occurrence of warpage of the heat-shrinkable laminate film as a whole.

Although the reason for the aforementioned effect is not necessarily clear, we believe as follows: Heat-shrinkable properties of the heat-shrinkable laminate film are made apparent when an amorphous portion, which has previously been stretched by molecular orientation of the constituent resin, shrinks back to a non-oriented state, whereas a crystalline portion serves to keep the amorphous portion from shrinkage until near the melting temperature is reached. That is, it is believed that reducing the difference in highest melting point between the resins making the layer (A) and the layer (B) may reduce the difference in heat shrinkage rate between the layer (A) and the layer (B).

Also, in this embodiment, at least two of the layers making the heat-shrinkable laminate film may be laminated by coextrusion to further inhibit warpage. For example, five layers, i.e., a substrate layer/a first adhesive layer/a gas barrier layer/a second adhesive layer/a seal layer, may be laminated by coextrusion in the stated order to further reduce the difference in heat shrinkage rate between the layer (A) and the layer (B). In addition, when laminated by coextrusion in the stated order, for example, the layer (A) may be peeled off as the substrate layer, the first adhesive layer, and the gas barrier layer, while the layer (B) as the second adhesive layer and the seal layer.

When the heat-shrinkable laminate film has a barrier layer containing a saponified ethylene-vinyl alcohol copolymer, it is preferred from the perspective of inhibiting warpage that the first adhesive layer has a melting point equal to or lower than that of the second adhesive layer. When the heat-shrinkable laminate film has a gas barrier layer containing an aromatic polyamide-based copolymer, it is preferred from the perspective of inhibiting warpage that the highest melting point of the resin making the first adhesive layer is equal to or lower than that of the resin making the second adhesive layer. The first adhesive layer preferably contains a modified polyolefin-based resin having a melting point of 130° C. or lower, more preferably a modified polyolefin-based resin having a melting point of 125° C. or lower, and still more preferably a modified polyethylene-based resin having a melting point of 125° C. or lower. Further, the second adhesive layer preferably contains a modified polyolefin-based resin having a melting point of 170° C. or lower, more preferably a modified polyolefin-based resin having a melting point of 165° C. or lower, and still more preferably a modified polyolefin-based resin having a melting point of 160° C. or lower. In addition, the melting point of the second adhesive layer is higher than that of the first adhesive layer preferably by 15° C. or more, more preferably by 20° C. or more, and still more preferably by 25° C. or more. The aforementioned arrangement of the adhesive layer makes it possible to control residual stress of the adhesive layer caused by molecular orientation, and may thus provide a heat-shrinkable and drawable laminate film with reduced warpage and good handling properties.

In addition, if the heat-shrinkable laminate film is formed by a dry lamination method, the interlayer strength, as well as anti-fogging properties tend to deteriorate under the influence of an anchor coating layer and, in this embodiment, the layer (A) and the layer (B) are preferably laminated by coextrusion. Moreover, if lamination is performed by coextrusion, it is preferred from the perspective of anti-fogging properties that the interlayer strength of the interface between the layer (A) and the layer (B) is preferably 0.5 N/15 mm or lower, more preferably 0.4 N/15 mm or lower, and still more preferably 0.3 N/15 mm or lower. To inhibit delamination, the interlayer strength may be 0.1 N/15 mm or higher. The heat-shrinkable film formed by lamination via the interlayer having such interlayer strength may exhibit excellent anti-fogging properties and be finished as a good-looking package.

In addition, the heat-shrinkable laminate film according to this embodiment, when having a barrier layer containing a saponified ethylene-vinyl alcohol copolymer, preferably has a heat shrinkage rate, as measured in accordance with ASTM-D2732, of 30% or more, more preferably 35% or more, at 100° C. in the machine direction, and still more preferably 35% or more at 100° C. both in the machine direction and transverse direction. Generally, with pillow shrink packaging and top seal packaging utilized in this embodiment, a tightly-sealed, well-finished package may be obtained when the heat shrinkage rate is 30% or more. As heat shrinkage conditions under which the heat shrinkage rate can be 30% or more, the heat shrinkage temperature is preferably at or below 100° C. or lower, more preferably at or below 95° C., and still more preferably at or below 90° C. When the heat shrinkage temperature at which the heat shrinkage rate can be 30% or more is at or below 100° C., it is possible to suppress container deformation of a tray with high expansion ratio, which is susceptible to thermal deformation at the time of shrinking process during packaging, resulting in a well-finished package.

In addition, the heat-shrinkable laminate film according to this embodiment, when having a gas barrier layer containing an aromatic polyamide-based copolymer, has a total-layer heat shrinkage rate, as measured in accordance with ASTM-D2732, of preferably 20% or more, more preferably 25% or more, and still more preferably 30% or more, at 140° C. in the machine direction. In addition, the total-layer heat shrinkage rate is preferably 30% or more at 140° C. either in machine direction (hereinafter, also referred to as "MD") or transverse direction (hereinafter, also referred to as "TD"), and is more preferably 30% or more both in the machine direction and transverse direction.

To obtain a heat shrinkage rate in the aforementioned range for the heat-shrinkable laminate film having a barrier layer containing a saponified ethylene-vinyl alcohol copolymer, the melting point of each of the resins making the heat-shrinkable laminate film is preferably 170° C. or lower, more preferably 165° C. or lower, and still more preferably 160° C. or lower. Insofar as each of the resins making the heat-shrinkable laminate film has a melting point of 170° C. or lower, relaxation of molecular orientation is promoted, and thus good heat-shrinkable properties suitable for shrink packaging may be provided.

To obtain a heat shrinkage rate in the aforementioned range for the heat-shrinkable laminate film having a gas barrier layer containing an aromatic polyamide-based copolymer, the melting point of each of the resins making the heat-shrinkable laminate film, other than the resin making the gas barrier layer, is preferably 170° C. or lower, more preferably 165° C. or lower, and still more preferably 160° C. or lower.

In addition, the heat-shrinkable laminate film has a heat shrinkage rate of 5% or less at 60° C. preferably in the transverse direction, and more preferably in both the machine direction and transverse direction. The heat-shrinkable laminate film thus configured is preferred because dimensional change of the film during transportation and/or storage can be suppressed.

The thickness of the heat-shrinkable laminate film is preferably 5 μm to 25 μm, more preferably 6 μm to 23 μm, and still more preferably 7 μm to 20 μm. Regarding the thickness of the heat-shrinkable laminate film, 5 μm or more is preferred from the perspective of improved pinhole resistance during transportation, and 23 μm or less is preferred in that it can reduce heat shrinkability and provide a well-finished package.

When the heat-shrinkable laminate film has a gas barrier layer containing a saponified ethylene-vinyl alcohol copolymer, the thickness of the gas barrier layer is preferably 2% to 15%, more preferably 3% to 10%, and still more preferably 4% to 8%, of the total thickness of the heat-shrinkable laminate film. A thickness of the gas barrier layer smaller than 2% of the total thickness tends to result in an inability to provide sufficient gas barrier performance, and a thickness larger than 15% tends to destabilize drawing during production. Therefore, the gas barrier layer having a thickness within the aforementioned range is preferred in that both drawing stability during production and gas barrier performance of the resulting package can be achieved.

When the heat-shrinkable laminate film has a gas barrier layer containing an aromatic polyamide-based copolymer, the thickness of the gas barrier layer is preferably 5% to 20%, more preferably 7% to 18%, and still more preferably 10% to 15%, of the total thickness of the heat-shrinkable laminate film. A thickness of the gas barrier layer smaller than 5% of the total thickness tends to result in an inability to provide sufficient gas barrier performance, and a thickness larger than 20% tends to destabilize drawing during production. Therefore, the gas barrier layer having a thickness within the aforementioned range is preferred in that both drawing stability during production and gas barrier performance of the resulting package can be achieved.

Although methods of producing the heat-shrinkable laminate film are not particularly limited, exemplary methods will be described below.

[Method of Producing the Heat-Shrinkable Film]

A method of producing the heat-shrinkable laminate film according to this embodiment includes forming a laminate having at least two resin layers (which may also be hereinafter referred to as an "unoriented film") by lamination using coextrusion, and subjecting the laminate to hot drawing.

Coextrusion will be described below.

In coextrusion, materials may be melt extruded from separate extruders, laminated in a multilayer die, melt coextruded, and quenched to obtain an unoriented film. The melt coextrusion method is not particularly limited herein, and examples thereof include those using multilayer T-dies, multilayer circular dies (annular dies), and the like. Among others, methods using multilayer circular dies are preferred. The use of multilayer circular dies is advantageous in facility footprint and investment efficiency, suitable for high-mix, low-volume production, and provides a desired heat shrinkage rate more easily.

Normally, water at 60° C. or lower is preferably used as a refrigerant for quenching. The refrigerant may be used in direct contact with molten resin, or indirectly used as an internal refrigerant for metal rolls. As internal refrigerants other than water, oil or otherwise well-known products are available, which in some cases may be used in combination with cool air blowing.

In a drawing step, for example, the resulting unoriented film is heated to or above the softening temperature of the resins making the unoriented film so that it can be stretched, for example, at least 1.5 times in MD and at least 3 times in TD. Such drawing step makes it possible to easily obtain a heat-shrinkable laminate film that has the predetermined heat shrinkage rate as mentioned above.

Draw ratio is selected properly depending on the purposes, and the film may optionally be subjected to heat treatment (heat relaxation treatment) after the drawing step. Heat relaxation treatment relaxes the orientation of molecules in the heat-shrinkable laminate film, with the result that dimensional change during transportation and/or storage can be further suppressed.

The drawing step may also be carried out by direct inflation that implements drawing while blowing air or nitrogen through the tube immediately after the melt extrusion. This method may also provide a cover tape having the predetermined heat shrinkage rate. However, to guarantee a proper heat shrinkage rate more reliably, biaxial orientation methods are preferred, and tubular methods (also called double-bubble methods) that perform biaxial hot drawing of the unoriented film formed by the aforementioned circular dies are more preferred. That is, the cover tape according to this embodiment is preferably a biaxially-oriented multilayer film that is produced by a tubular method performing biaxial drawing.

The production method according to this embodiment may include a crosslinking step of causing crosslinking of resins before or after the drawing.

When such crosslinking is caused, crosslinking is preferably caused by energy ray irradiation prior to heating of resins for drawing. This may increase the melt tension of the laminate during the hot drawing, resulting in more stable drawing. Note that crosslinking of resins may be caused by irradiating the oriented laminate after the drawing with an energy ray. Examples of the energy ray used include ionizing radiation, such as ultraviolet rays, electron rays, x-rays, and γ-rays. Among these, electron rays are preferred.

In addition, surface treatment, such as corona treatment, plasma treatment, ozone treatment, and flame treatment, may be performed on the surface of the laminate that has been hot drawn in the aforementioned drawing step and that includes the substrate layer, thereby imparting printability to the heat-shrinkable laminate film.

EXAMPLES

Examples of our heat-shrinkable laminate film will now be described in detail below. However, our film is not limited to the disclosed examples. The melting point of constituent resins, as well as the interlayer strength, heat shrinkage rate, oxygen barrier properties, warpage, and anti-fogging properties of laminate films in our examples and comparative examples were measured and evaluated as indicated below.

Attempts were made to peel each of the resulting heat-shrinkable laminate films into a layer (A) and a layer (B) using a pressure sensitive adhesive tape.

[Melting Point of Constituent Resins]

In accordance with JIS-K-7210, 100 mg of resins was weighed for use in Examples A1 to A11 and in Comparative Examples A1 to A3, respectively, and after the temperature had been raised from 0° C. to 200° C. at a heating rate of 10° C./min, then dropped from 200° C. to 0° C. at a cooling rate of 10° C./min to remove heat history of the resins, and then measurement and evaluation were made of the melting points while the temperature was raised again from 0° C. to 200° C. at a heating rate of 10° C./min.

In accordance with JIS-K-7210, 100 mg of resins was weighed for use in Examples B1 to B11 and in Comparative Examples B1 to B4, respectively, and after the temperature had been raised from 0° C. to 300° C. at a heating rate of 10° C./min, then dropped from 300° C. to 0° C. at a cooling rate of 10° C./min to remove heat history of the resins, and then measurement and evaluation were made of the melting points while the temperature was raised again from 0° C. to 300° C. at a heating rate of 10° C./min.

[Interlayer Strength]

To determine the interlayer strength between the layer (A) and the layer (B) of each of the resulting heat-shrinkable laminate films, T-type peeling tests were conducted on samples slit into 15-mm wide strips, under the conditions of 23° C., 50% RH, sample length of 50 mm, chuck distance of 10 mm, and tension rate of 300 mm/min, using an autograph manufactured by Shimadzu Corporation.

Further, measurement was made of heat shrinkage rate at 100° C. for each layer (A) and each layer (B), as described in the heat shrinkage rate measurement method below.

[Heat Shrinkage Rate]

Regarding Examples A1 to A11 and Comparative Examples A1 to A3, laminate films were allowed to shrink for 1 minute at temperatures of 100° C. and 60° C., respectively, to determine their heat shrinkage rates in conformance with ASTM-D2732. Measurement was made in machine direction and transverse direction, respectively, and the results were averaged and used as heat shrinkage rates. Regarding Examples B1 to B11 and Comparative Examples B1 to B4, laminate films were allowed to shrink for 1 minute at temperatures of 140° C., 100° C., and 60° C., respectively, to determine their heat shrinkage rates in conformance with ASTM-D2732. Measurement was made in machine direction and transverse direction, respectively, and the results were averaged and used as heat shrinkage rates.

[Heat Sealing Properties]

Each of the resulting laminate films was slit into strips having a predetermined width, and used for packaging with an elliptical tray container for top sealing made of polypropylene and containing 200 g of clay. The packaging was performed using TL-30005 manufactured by Ibaraki Seiki Co., Ltd., and the packaging conditions were as follows: packaging rate of 30 packs/min, heat sealing pressure of 0.4 MPa. Note that the packaging was conducted such that the TD direction of the laminate film coincides with the minor axis direction of the tray container. Sealed portions were visually inspected for roughening of surfaces and pinholes to assess the heat sealing properties, and the sealed portions were peeled by hand to evaluate the sealing strength based on the following criteria:

<Evaluation Criteria>

A: the heat sealing temperature range within which no roughening or pinhole occurred on the surface of the sealed portion is 10° C. or higher, with sufficient sealing strength and very good heat sealing properties B: the heat sealing temperature range within which no roughening or pinhole occurred on the surface of the sealed portion is 10° C. or higher, with sealing strength and good heat sealing properties D: the heat sealing temperature range within which no roughening or pinhole occurred on the surface of the sealed portion is lower than 10° C., or sealing strength is insufficient and heat sealing properties are poor

[Barrier Properties]

Measurement was made of oxygen transmission rate under the oxygen condition of 65% RH and with the measurement temperature of 23° C., using an oxygen permeation analyzer manufactured by MOCON (OX-TRAN® 2/21SH). The oxygen transmission rate measured upon the expiration of 3 hours from the start of the measurement was used as an indicator for evaluating oxygen barrier properties. Note that the oxygen transmission rate was measured in units of "$cc/m^2 \cdot day \cdot atm$."

<Evaluation Criteria>

A: oxygen transmission rate is 50 $cc/m^2 \cdot day \cdot atm$ or lower, and gas barrier properties are excellent B: oxygen transmission rate is 60 $cc/m^2 \cdot day \cdot atm$ or lower, and gas barrier properties are good D: oxygen transmission rate is higher than 60 $cc/m^2 \cdot day \cdot atm$, and gas barrier properties are insufficient

[Warpage]

Heat-shrinkable laminate films, which were each cut into dimensions of 300 mm in MD and 300 mm in TD, were allowed to stand for 1 hour at 23° C., 50% RH. Then, slits of 250 mm in MD were made in each film at intervals of 100 mm in TD, and measurement was made of the height of the rise of a slit located at 125 mm in MD from the horizontal to determine the amount of warpage. An arithmetic mean of the measurement results of two slits was calculated and used as an indicator for evaluating warpage.

<Evaluation Criteria>

A: laminate film having 3-mm or less warpage and exhibiting excellent handling properties B: laminate film having 4-mm or less warpage and exhibiting very good handling properties C: laminate film having 5-mm or less warpage and exhibiting good handling properties D: laminate film having over 5-mm warpage and difficult to handle

[Anti-Fogging Properties]

Each of the resulting laminate films was slit into strips having a predetermined width, and used for packaging with a tray container made of polypropylene and containing 200 g of 20° C. water. Each package was left standing in a refrigerator set at 5° C., and after 2 hours the appearance was visually observed to evaluate anti-fogging properties based on the following criteria:

<Evaluation Criteria>

A: laminate film with no water droplets, presenting good appearance

D: laminate film with water droplets, unable to see through, poor appearance

[Finished Quality of Package]

Each of the resulting laminate films was slit into strips having a predetermined width and used for packaging with a tray container made of polystyrene and containing 200 g of clay, at a packaging rate of 40 packs/min, using DW2002GP manufactured by Omori Machinery Co., Ltd. Note that the packaging was conducted such that the transverse direction of the laminate film coincides with the minor axis direction of the tray container. Using FB-800 manufactured by K & U systems as a hot air tunnel, hot air temperature was set at 115° C. for Examples A1 to A11 and Comparative Examples A1 to A3. Also, using FB-800 manufactured by K & U systems as the hot air tunnel, hot air temperature was set at 145° C. for Examples B1 to B11 and Comparative Examples B1 to B4. The appearance of the tray container was visually observed to evaluate the finished quality of each package based on the following criteria:

<Evaluation Criteria>

A: tray container with no deformation (such as strain and warpage) and minor "dog ears" at the corners B: tray container with no deformation (such as strain and warpage), but apparent dog ears at the corners D: tray container with deformation (such as strain and warpage) and significant dog ears at the corners due to insufficient shrinkage The following resins were used in Examples A1 to A11 and Comparative Examples A1 to A3:

PPa1: propylene-based copolymer (PS522M, melting point 145° C., manufactured by SunAllomer Ltd.)

PPa2: propylene-based copolymer (PF621S, melting point 143° C., manufactured by SunAllomer Ltd.)

PPa3: propylene-based copolymer (5C37F, melting point 142° C., manufactured by SunAllomer Ltd.)

PPa4: propylene-based copolymer (PL500A, melting point 161° C., manufactured by SunAllomer Ltd.)

PEa1: linear ultra-low-density polyethylene (AFFINITY 1880G, melting point 100° C., manufactured by The Dow Chemical Company)

PEa2: linear low-density polyethylene (SP2020, melting point 116° C., manufactured by Prime Polymer Co., Ltd.)

PEa3: linear low-density polyethylene (UMERIT 1520F, melting point 118° C., manufactured by Ube-Maruzen Polyethylene Co., Ltd.)

PEa4: high-pressure low-density polyethylene (M2102, melting point 112° C., manufactured by Asahi Kasei Chemicals Corporation)

EVOH1: saponified ethylene-vinyl alcohol copolymer (EP-E105A, melting point 165° C., ethylene content 44 mol %, manufactured by The Nippon Synthetic Chemical Industry Co., Ltd.)

EVOH2: saponified ethylene-vinyl alcohol copolymer (SP292, melting point 165° C., ethylene content 44 mol %, manufactured by Kuraray Co., Ltd.)

EVOH3: saponified ethylene-vinyl alcohol copolymer (GH3804B, melting point 159° C., ethylene content 38 mol %, manufactured by The Nippon Synthetic Chemical Industry Co., Ltd.)

EVOH4: saponified ethylene-vinyl alcohol copolymer (AT4403, melting point 164° C., ethylene content 44 mol %, manufactured by The Nippon Synthetic Chemical Industry Co., Ltd.)

GLa1: modified polyolefin-based resin (MODIC P565, melting point 143° C., manufactured by Mitsubishi Chemical Corporation)

GLa2: modified polypropylene-based resin (ADMER QF500, melting point 161° C., manufactured by Mitsui Chemicals, Inc.)

GLa3: modified polyethylene-based resin (ADMER NF587, melting point 120° C., manufactured by Mitsui Chemicals, Inc.)

GLa4: modified polypropylene-based resin (ADMER QF580, melting point 145° C., manufactured by Mitsui Chemicals, Inc.)

GLa5: anchor coating agent (ARROWBASE SB1200, manufactured by Unitika Limited.)

AFa1: surfactant (L71D, manufactured by Riken Vitamin Co., Ltd.)

AFa2: surfactant (B205, manufactured by Riken Vitamin Co., Ltd.)

The following resins were used in Examples B1 to B11 and Comparative Examples B1 to B4:

PPb1: propylene-based copolymer (PS522M, melting point 145° C., manufactured by SunAllomer Ltd.)

PPb2: propylene-based copolymer (PF621S, melting point 143° C., manufactured by SunAllomer Ltd.)

PPb3: propylene-based copolymer (5C37F, melting point 142° C., manufactured by SunAllomer Ltd.)

PPb4: propylene-based copolymer (PL500A, melting point 161° C., manufactured by SunAllomer Ltd.)

PEb1: linear ultra-low-density polyethylene (AFFINITY 1880G, melting point 100° C., manufactured by The Dow Chemical Company)

PEb2: linear low-density polyethylene (SP2020, melting point 116° C., manufactured by Prime Polymer Co., Ltd.)

PEb3: linear low-density polyethylene (UMERIT 1520F, melting point 118° C., manufactured by Ube-Maruzen Polyethylene Co., Ltd.)

PEb4: high-pressure low-density polyethylene (M2102, melting point 112° C., manufactured by Asahi Kasei Chemicals Corporation)

Ny1: adipic acid-meta-xylylene diamine polycondensate (melting point 237° C., manufactured by Mitsubishi Gas Chemical Company, Inc.)

Ny2: adipic acid-isophthalic acid-meta-xylylene diamine polycondensate (melting point 230° C., manufactured by Mitsubishi Gas Chemical Company, Inc.)

Ny3: nylon-6,66 copolymer resin (80 mass %)+amorphous nylon (20 mass %) (melting point 195° C., manufactured by Mitsubishi Gas Chemical Company, Inc.)

GLb1: modified polyolefin-based resin (MODIC P565, melting point 143° C., manufactured by Mitsubishi Chemical Corporation)

GLb2: modified polypropylene-based resin (ADMER QF500, melting point 161° C., manufactured by Mitsui Chemicals, Inc.)

GLb3: modified polyethylene-based resin (ADMER NF587, melting point 120° C., manufactured by Mitsui Chemicals, Inc.)

GLb4: modified polypropylene-based resin (ADMER QF580, melting point 145° C., manufactured by Mitsui Chemicals, Inc.)

GLb5: anchor coating agent (ARROWBASE SB1200, manufactured by Unitika Limited.)

AFb1: surfactant (L71D, manufactured by Riken Vitamin Co., Ltd.)
AFb2: surfactant (B205, manufactured by Riken Vitamin Co., Ltd.)

Example A1

Using a mixture of 97 mass % PPa1 and 3 mass % AFa1 as a substrate layer, EVOH1 as a gas barrier layer, a mixture of 97 mass % PEa1 and 3 mass % AFa1 as a seal layer, GLa1 as a first adhesive layer, and GLa2 as a second adhesive layer, these layers were coextruded using annular dies so that the layer arrangement of the substrate layer/the first adhesive layer/the gas barrier layer/the second adhesive layer/the seal layer was obtained with layer proportions (%) of 22.5/22.5/10.0/22.5/22.5 of the whole, and then quenched and solidified in cold water. As a result, a tubular unoriented film was formed with uniform thickness precision for each layer. Specific layer configurations are presented in Table 1.

The unoriented film was passed through two pairs of differential nip rolls in a stretching machine under heating conditions, stretched 4 times in MD and 4 times in TD (16 times in area draw ratio) by blowing air into the film, and then subjected to heat treatment to form a laminate film with the laminated layers.

The resulting heat-shrinkable laminate film was determined to have a layer (A) formed by the substrate layer/the first adhesive layer/the gas barrier layer, and a layer (B) formed by the second adhesive layer/the seal layer, and to have an interlayer strength of 0.3 N/15 mm. Table 4 lists the evaluation results of the obtained heat-shrinkable laminate film.

Examples A2 to A12

Heat-shrinkable laminate films were obtained in the same manner as Example A1, except that the compositions of the respective layers were changed as shown in Tables 1 to 4. Tables 5 to 8 list the evaluation results of the obtained heat-shrinkable laminate films.

Comparative Example A1

As shown in Table 4, using PEa3 as a substrate layer and a seal layer, EVOH1 as a gas barrier layer, GLa3 as a first adhesive layer, and GLa4 as a second adhesive layer, these layers were coextruded using annular dies so that the layer arrangement of the substrate layer/the first adhesive layer/the gas barrier layer/the second adhesive layer/the seal layer was obtained with layer proportions (%) of 22.5/22.5/10.0/22.5/22.5 of the whole, and then quenched and solidified in cold water. As a result, a tubular unoriented film was formed with uniform thickness precision for each layer.

The unoriented film was passed through two pairs of differential nip rolls in a stretching machine under heating conditions, stretched 4 times in MD and 4 times in TD (16 times in area draw ratio) by blowing air into the film, and then subjected to heat treatment to form a laminate film with the laminated layers.

The resulting heat-shrinkable laminate film was determined to have a layer (A) formed by the substrate layer/the first adhesive layer/the gas barrier layer, and a layer (B) formed by the second adhesive layer/the seal layer, and to have an interlayer strength of 0.5 N/15 mm. Table 8 lists the evaluation results of the obtained heat-shrinkable laminate film.

Comparative Example A2

Using a mixture of 97 mass % PPa4 and 3 mass % AFa1 as a substrate layer, a mixture of 97 mass % PEa4 and 3 mass % AFa1 as a seal layer, EVOH1 as a gas barrier layer, GLa2 as a first adhesive layer, and GLa3 as a second adhesive layer, a tubular unoriented film was formed with uniform thickness precision for each layer.

The unoriented film was passed through two pairs of differential nip rolls in a stretching machine under heating conditions, stretched 4 times in MD and 4 times in TD (16 times in area draw ratio) by blowing air into the film, and then subjected to heat treatment to form a laminate film.

The resulting heat-shrinkable laminate film was formed by the substrate layer/the first adhesive layer/the gas barrier layer/the second adhesive layer/the seal layer in the stated order. The heat-shrinkable laminate film was determined to have a layer (A) formed by the substrate layer/the first adhesive layer/the gas barrier layer, and a layer (B) formed by the second adhesive layer/the seal layer, and to have an interlayer strength of 0.5 N/15 mm. Table 8 lists the evaluation results of the obtained heat-shrinkable laminate film.

Comparative Example A3

Using a mixture of 95 mass % PPa4, 3 mass % AFa1, and 2 mass % AFa2 as a substrate layer, a mixture of 95 mass % PEa4, 3 mass % AFa1, and 2 mass % AFa2 as a seal layer, and EVOH1 as a gas barrier layer, a tubular unoriented film was obtained with uniform thickness precision for each layer.

The unoriented film was passed through two pairs of differential nip rolls in a stretching machine under heating conditions, stretched 4 times in MD and 4 times in TD (16 times in area draw ratio) by blowing air into the film, and then subjected to heat treatment to form a laminate film, in which the layers were laminated by a dry lamination method using GL5 as adhesive layers. The resulting heat-shrinkable laminate film was formed by the substrate layer/the first adhesive layer/the gas barrier layer/the second adhesive layer/the seal layer in the stated order. In this case, the layer (A) and the layer (B) could not be peeled away from each other. Table 8 lists the evaluation results of the obtained heat-shrinkable laminate film.

Comparative Example A4

A laminate film was formed according to Example 4 shown in JPS588644A. The resulting laminate film was formed by the substrate layer/the first adhesive layer/the gas barrier layer/the second adhesive layer/the seal layer in the stated order. The laminate film was determined to have a layer (A) formed by the substrate layer/the first adhesive layer/the gas barrier layer, and a layer (B) formed by the second adhesive layer/the seal layer, and to have an interlayer strength of 0.4 N/15 mm. Table 8 lists the evaluation results of the obtained laminate film.

Comparative Example A5

A laminate film was formed according to Example 7 shown in JP2008545558A. The resulting laminate film was formed by a first substrate layer/a second substrate layer/a first adhesive layer/a gas barrier layer/a first adhesive layer/a second substrate layer/a seal layer in the stated order. The laminate film was determined to have a layer (A) formed by the first substrate layer/the second substrate layer/the first adhesive layer, and a layer (B) formed by the gas barrier layer/the first adhesive layer/the second substrate layer/the seal layer, and to have an interlayer strength of 0.5 N/15 mm. Table 8 lists the evaluation results of the obtained laminate film.

TABLE 1

|  | Ex. A1 | Ex. A2 | Ex. A3 | Ex. A4 | Ex. A5 |
|---|---|---|---|---|---|
| Layer 1 | Substrate Layer | Substrate Layer | Substrate Layer | Substrate Layer | Substrate Layer |
| Composition | PPa1/AFa1 97/3 | PPa1/AFa1 97/3 | PPa1/AFa1 97/3 | PPa2/AFa1 97/3 | PPa3/AFa1 97/3 |
| Thickness (μm) | 5.3 | 3.5 | 3.5 | 3.5 | 3.5 |
| Layer 2 | Adhesive Layer | Adhesive Layer | Adhesive Layer | Adhesive Layer | Adhesive Layer |
| Composition | GLa1 | GLa1 | GLa3 | GLa3 | GLa3 |
| Thickness (μm) | 5.1 | 3.3 | 3.3 | 3.3 | 3.3 |
| Layer 3 | Gas Barrier Layer | Gas Barrier Layer | Gas Barrier Layer | Gas Barrier Layer | Gas Barrier Layer |
| Composition | EVOH1 | EVOH1 | EVOH1 | EVOH1 | EVOH1 |
| Thickness (μm) | 1.2 | 0.8 | 0.8 | 0.8 | 0.8 |
| Layer 4 | Adhesive Layer | Adhesive Layer | Adhesive Layer | Adhesive Layer | Adhesive Layer |
| Composition | GLa2 | GLa2 | GLa4 | GLa4 | GLa4 |
| Thickness (μm) | 4.6 | 3.0 | 3.0 | 3.0 | 3.0 |
| Layer 5 | Seal Layer | Seal Layer | Seal Layer | Seal Layer | Seal Layer |
| Composition | PEa1/AFa1 97/3 | PEa1/AFa1 97/3 | PEa1/AFa1 97/3 | PEa2/AFa1 97/3 | PEa3/AFa1 97/3 |
| Thickness (μm) | 6.9 | 4.5 | 4.5 | 4.5 | 4.5 |
| Total Layer Thickness (μm) | 23.0 | 15.0 | 15.0 | 15.0 | 15.0 |
| Layers Coextruded | Layer 1 to Layer 5 | Layer 1 to Layer 5 | Layer 1 to Layer 5 | Layer 1 to Layer 5 | Layer 1 to Layer 5 |

TABLE 2

|  | Ex. A6 | Ex. A7 | Ex. A8 | Ex. A9 | Ex. A10 |
|---|---|---|---|---|---|
| Layer 1 | Substrate Layer | Substrate Layer | Substrate Layer | Substrate Layer | Substrate Layer |
| Composition | PPa4/AFa1 97/3 | PPa4/AFa1 97/3 | PPa4/AFa1 97/3 | PPa4/AFa1 97/3 | PPa3/AFa1/AFa2 95/3/2 |
| Thickness (μm) | 3.5 | 3.5 | 3.5 | 3.5 | 3.5 |
| Layer 2 | Adhesive Layer | Adhesive Layer | Adhesive Layer | Adhesive Layer | Adhesive Layer |
| Composition | GLa3 | GLa3 | GLa3 | GLa3 | GLa3 |
| Thickness (μm) | 3.3 | 3.3 | 3.3 | 3.3 | 3.3 |
| Layer 3 | Gas Barrier Layer | Gas Barrier Layer | Gas Barrier Layer | Gas Barrier Layer | Gas Barrier Layer |
| Composition | EVOH1 | EVOH2 | EVOH3 | EVOH4 | EVOH4 |
| Thickness (μm) | 0.8 | 0.8 | 0.8 | 0.8 | 0.8 |
| Layer 4 | Adhesive Layer | Adhesive Layer | Adhesive Layer | Adhesive Layer | Adhesive Layer |
| Composition | GLa4 | GLa4 | GLa4 | GLa4 | GLa4 |
| Thickness (μm) | 3.0 | 3.0 | 3.0 | 3.0 | 3.0 |
| Layer 5 | Seal Layer | Seal Layer | Seal Layer | Seal Layer | Seal Layer |
| Composition | PEa4/AFa1 97/3 | PEa4/AFa1 97/3 | PEa4/AFa1 97/3 | PEa4/AFa1 97/3 | PEa3/AFa1/AFa2 95/3/2 |
| Thickness (μm) | 4.5 | 4.5 | 4.5 | 4.5 | 4.5 |
| Total Layer Thickness (μm) | 15.0 | 15.0 | 15.0 | 15.0 | 15.0 |
| Layers Coextruded | Layer 1 to Layer 5 | Layer 1 to Layer 5 | Layer 1 to Layer 5 | Layer 1 to Layer 5 | Layer 1 to Layer 5 |

TABLE 3

|  | Ex. A11 | Ex. A12 |
|---|---|---|
| Layer 1 | Substrate Layer | Substrate Layer |
| Composition | PPa4/AFa1/AFa2 95/3/2 | PPa1/AFa1 97/3 |
| Thickness (μm) | 3.5 | 9.0 |
| Layer 2 | Adhesive Layer | Gas Barrier Layer |
| Composition | GLa3 | EVOH4 |
| Thickness (μm) | 3.3 | 1.0 |
| Layer 3 | Gas Barrier Layer | Seal Layer |
| Composition | EVOH4 | PEa4/AFa1 97/3 |
| Thickness (μm) | 0.8 | 30.0 |
| Layer 4 | Adhesive Layer | — |
| Composition | GLa4 | — |
| Thickness (μm) | 3.0 | — |
| Layer 5 | Seal Layer | — |
| Composition | PEa4/AFa1/AFa2 95/3/2 | — |
| Thickness (μm) | 4.5 | — |
| Total Layer Thickness (μm) | 15.0 | 40.0 |
| Layers Coextruded | Layer 1 to Layer 5 | Layer 1 to Layer 3 |

TABLE 4

|  | Comp. Ex. A1 | Comp. Ex. A2 | Comp. Ex. A3 | Comp. Ex. A4 | Comp. Ex. A5 |
| --- | --- | --- | --- | --- | --- |
| Layer 1 | Substrate Layer | Substrate Layer | Substrate Layer | Substrate Layer | First Substrate Layer |
| Composition | PEa3/AFa1 97/3 | PPa4/AFa1 97/3 | PPa4/AFa1/AFa2 95/3/2 | ethylene-Propylene random | ternary PP (5C37F) |
| Thickness (μm) | 3.5 | 3.5 | 7.9 | 10.0 | 3.6 |
| Layer 2 | Adhesive Layer | Adhesive Layer | Adhesive Layer | Adhesive Layer | Second Substrate Layer |
| Composition | GLa3 | GLa2 | GLa5 | modified polyethylene-based adhesive | isotactic PP/ternary PP 50/50 |
| Thickness (μm) | 3.3 | 3.3 | 0.1 | 5.0 | 4.0 |
| Layer 3 | Gas Barrier Layer | Gas Barrier Layer | Gas Barrier Layer | Gas Barrier Layer | Adhesive Layer |
| Composition | EVOH1 | EVOH1 | EVOH1 | saponified ethylene-vinyl acetate | maleic anhydride-modified polypropylene |
| Thickness (μm) | 1.5 | 1.5 | 4.0 | 5.0 | 1.0 |
| Layer 4 | Adhesive Layer | Adhesive Layer | Adhesive Layer | Adhesive Layer | Gas Barrier Layer |
| Composition | GLa4 | GLa3 | GLa5 | modified polyethylene-based | ethylene-vinyl alcohol copolymer |
| Thickness (μm) | 3.0 | 3.0 | 0.1 | 5.0 | 1.7 |
| Layer 5 | Seal Layer | Seal Layer | Seal Layer | Seal Layer | Adhesive Layer |
| Composition | PEa3/AFa1 97/3 | PEa4/AFa1 97/3 | PEa4/AFa1/AFa2 95/3/2 | low-density polyethylene resin | maleic anhydride-modified polypropylene |
| Thickness (μm) | 4.5 | 4.5 | 7.9 | 25.0 | 1.0 |
| Layer 6 | — | — | — | — | Second Substrate Layer |
| Composition | — | — | — | — | isotactic PP/ternary PP 50/50 |
| Thickness (μm) | — | — | — | — | 4.0 |
| Layer 7 | — | — | — | — | Seal Layer |
| Composition | — | — | — | — | ternary PP (5C37F) |
| Thickness (μm) | — | — | — | — | 3.7 |
| Total Layer Thickness (μm) | 15.0 | 15.0 | 20.0 | 20.0 | 19.0 |
| Layers Coextruded | Layer 1 to Layer 5 | Layer 1 to Layer 5 | None | Layer 1 to Layer 5 | Layer 1 to Layer 7 |

TABLE 5

|  | Ex. A1 | Ex. A2 | Ex. A3 | Ex. A4 | Ex. A5 |
| --- | --- | --- | --- | --- | --- |
| Oxygen Transmission Rate (cc/m² · atm · day) | 30 | 40 | 41 | 39 | 40 |
| Layer (A) | Layer 1 to Layer 3 | Layer 1 to Layer 3 | Layer 1 to Layer 3 | Layer 1 to Layer 3 | Layer 1 to Layer 3 |
| Layer (B) | Layer 4 to Layer 5 | Layer 4 to Layer 5 | Layer 4 to Layer 5 | Layer 4 to Layer 5 | Layer 4 to Layer 5 |
| Interlayer Strength (N/15 mm) | 0.3 | 0.3 | 0.4 | 0.4 | 0.4 |
| Melting Point of Substrate Layer-Melting Point of Seal Layer (° C.) | 45 | 45 | 45 | 27 | 24 |
| Melting Point of Second Adhesive Layer-Melting Point of First Adhesive Layer (° C.) | 18 | 18 | 25 | 25 | 25 |
| Heat Shrinkage Rate at 100° C. in MD/TD |  |  |  |  |  |
| Layer (A) (%) | 33/30 | 33/30 | 37/36 | 37/36 | 36/36 |
| Layer (B) (%) | 38/36 | 37/36 | 31/30 | 36/36 | 37/36 |
| Difference (%) | 5/6 | 4/6 | 5/6 | 1/0 | 1/0 |
| Total Layer (%) | 35/33 | 35/33 | 36/36 | 37/36 | 36/36 |
| Heat Shrinkage Rate at 60° C. in MD/TD |  |  |  |  |  |
| Total Layer (%) | 3/2 | 3/2 | 5/3 | 5/3 | 5/3 |
| Evaluation of Heat Sealing Properties | A | A | A | A | A |
| Evaluation of Warpage | B | B | B | A | A |
| Evaluation of Barrier Properties | A | A | A | A | A |
| Evaluation of Anti-fogging Properties | A | A | A | A | A |
| Evaluation of Finished Quality of Package | B | B | A | A | A |

TABLE 6

|  | Ex. A6 | Ex. A7 | Ex. A8 | Ex. A9 | Ex. A10 |
|---|---|---|---|---|---|
| Oxygen Transmission Rate (cc/m$^2$ · atm · day) | 40 | 47 | 33 | 40 | 39 |
| Layer (A) | Layer 1 to Layer 3 | Layer 1 to Layer 3 | Layer 1 to Layer 3 | Layer 1 to Layer 3 | Layer 1 to Layer 3 |
| Layer (B) | Layer 4 to Layer 5 | Layer 4 to Layer 5 | Layer 4 to Layer 5 | Layer 4 to Layer 5 | Layer 4 to Layer 5 |
| Interlayer Strength (N/15 mm) | 0.4 | 0.4 | 0.3 | 0.4 | 0.4 |
| Melting Point of Substrate Layer − Melting Point of Seal Layer (° C.) | 49 | 49 | 49 | 49 | 24 |
| Melting Point of Second Adhesive Layer − Melting Point of First Adhesive Layer (° C.) | 25 | 25 | 25 | 25 | 25 |
| Heat Shrinkage Rate at 100° C. in MD/TD |  |  |  |  |  |
| Layer (A) (%) | 33/30 | 33/32 | 31/31 | 32/32 | 37/36 |
| Layer (B) (%) | 37/36 | 37/35 | 37/36 | 38/35 | 36/35 |
| Difference (%) | 4/6 | 4/3 | 6/5 | 6/3 | 1/1 |
| Total Layer (%) | 35/33 | 35/33 | 35/34 | 35/33 | 36/35 |
| Heat Shrinkage Rate at 60° C. in MD/TD |  |  |  |  |  |
| Total Layer (%) | 4/4 | 4/3 | 4/3 | 4/3 | 5/3 |
| Evaluation of Heat Sealing Properties | A | A | A | A | A |
| Evaluation of Warpage | B | B | B | B | A |
| Evaluation of Barrier Properties | A | A | A | A | A |
| Evaluation of Anti-fogging Properties | A | A | A | A | A |
| Evaluation of Finished Quality of Package | B | B | B | B | A |

TABLE 7

|  | Ex. A11 | Ex. A12 |
|---|---|---|
| Oxygen Transmission Rate (cc/m$^2$ · atm · day) | 40 | 20 |
| Layer (A) | Layer 1 to Layer 3 | Layer 1 |
| Layer (B) | Layer 4 to Layer 5 | Layer 2 to Layer 3 |
| Interlayer Strength (N/15 mm) | 0.4 | 0.1 |
| Melting Point of Substrate Layer-Melting Point of Seal Layer (° C.) | 49 | 33 |
| Melting Point of Second Adhesive Layer-Melting Point of First Adhesive Layer (° C.) | 25 | — |
| Heat Shrinkage Rate at 100° C. in MD/TD |  |  |
| Layer (A) (%) | 31/32 | 18/16 |
| Layer (B) (%) | 37/35 | 10/9 |
| Difference (%) | 6/3 | 8/7 |
| Total Layer (%) | 35/32 | 13/12 |
| Heat Shrinkage Rate at 60° C. in MD/TD |  |  |
| Total Layer (%) | 4/3 | 1/1 |
| Evaluation of Heat Sealing Properties | A | B |
| Evaluation of Warpage | B | B |
| Evaluation of Barrier Properties | A | A |
| Evaluation of Anti-fogging Properties | A | A |
| Evaluation of Finished Quality of Package | B | B |

TABLE 8

|  | Comp. Ex. A1 | Comp. Ex. A2 | Comp. Ex. A3 | Comp. Ex. A4 | Comp. Ex. A5 |
|---|---|---|---|---|---|
| Oxygen Transmission Rate (cc/m$^2$ · atm · day) | 36 | 40 | 30 | 11 | 21 |
| Layer (A) | Layer 1 to Layer 3 | Layer 1 to Layer 2 | unpeelable | Layer 1 to Layer 2 | Layer 1 to Layer 3 |
| Layer (B) | Layer 4 to Layer 5 | Layer 3 to Layer 5 | unpeelable | Layer 3 to Layer 5 | Layer 4 to Layer 7 |
| Interlayer Strength (N/15 mm) | 0.5 | 0.5 | unpeelable | 0.4 | 0.5 |
| Melting Point of Substrate Layer − Melting Point of Seal Layer (° C.) | 0 | 49 | 41 | 35 | 0 |
| Melting Point of Second Adhesive Layer − Melting Point of First Adhesive Layer (° C.) | 25 | −40 | 0 | 0 | 0 |

TABLE 8-continued

|  | Comp. Ex. A1 | Comp. Ex. A2 | Comp. Ex. A3 | Comp. Ex. A4 | Comp. Ex. A5 |
|---|---|---|---|---|---|
| Heat Shrinkage Rate at 100° C. in MD/TD | | | | | |
| Layer (A) (%) | 38/37 | 30/30 | unpeelable | 35/34 | 3/2 |
| Layer (B) (%) | 40/38 | 42/41 | unpeelable | 20/22 | 1/1 |
| Difference (%) | 2/1 | 12/11 | unpeelable | 15/12 | 2/1 |
| Total Layer (%) | 38/37 | 35/33 | 35/28 | 24/25 | 3/2 |
| Heat Shrinkage Rate at 60° C. in MD/TD | | | | | |
| Total Layer (%) | 6/5 | 6/4 | 3/2 | 4/4 | 0/0 |
| Evaluation of Heat Sealing Properties | D | A | A | A | D |
| Evaluation of Warpage | A | D | D | D | A |
| Evaluation of Barrier Properties | A | A | A | A | A |
| Evaluation of Anti-fogging Properties | A | A | D | D | D |
| Evaluation of Finished Quality of Package | A | B | B | B | B |

It can be seen from the results above that the heat-shrinkable laminate films obtained in Examples A1 to A12 exhibit good sealing properties and reduced warpage, have excellent anti-fogging properties, and provide well-finished packages.

In contrast, it can be seen from the results above that the heat-shrinkable laminate film obtained in Comparative Example A1 is susceptible to seal failures during heat sealing, and is not suitable for packaging applications. It is appreciated that the heat-shrinkable laminate film obtained in Comparative Example A2 is unfavorable for handling during the packaging process due to the occurrence of a warpage, and is not suitable for packaging applications. It is further appreciated that the film obtained in Comparative Example A3 exhibits poor anti-fogging properties since it is formed by a lamination method, and is not suitable for packaging applications.

Example B1

Using a mixture of 97 mass % PPb1 and 3 mass % AFb1 as a substrate layer, Ny1 as a gas barrier layer, a mixture of 97 mass % PEb1 and 3 mass % AFb1 as a seal layer, GLb1 as a first adhesive layer, and GLb2 as a second adhesive layer, these layers were coextruded using annular dies so that the layer arrangement of the substrate layer/the first adhesive layer/the gas barrier layer/the second adhesive layer/the seal layer was obtained with layer proportions (%) of 25/20/10/20/25 of the whole, and then quenched and solidified in cold water. As a result, a tubular unoriented film was formed with uniform thickness precision for each layer. Specific layer configurations are presented in Table 9.

The unoriented film was passed through two pairs of differential nip rolls in a stretching machine under heating conditions, stretched 4 times in MD and 4 times in TD (16 times in area draw ratio) by blowing air into the film, and then subjected to heat treatment to form a laminate film with the laminated layers.

The resulting heat-shrinkable laminate film was determined to have a layer (A) formed by the substrate layer/the first adhesive layer/the gas barrier layer, and a layer (B) formed by the second adhesive layer/the seal layer, and to have an interlayer strength of 0.3 N/15 mm. Table 12 lists the evaluation results of the obtained heat-shrinkable laminate films.

Examples B2 to B12

Heat-shrinkable laminate films were obtained in the same manner as Example B1, except that the compositions of the respective layers were changed as shown in Tables 9 to 11. Tables 12 to 14 list the evaluation results of the obtained heat-shrinkable laminate films.

Comparative Example B1

As shown in Table 11, using PEb3 as a substrate layer and a seal layer, Ny1 as a gas barrier layer, GLb3 as a first adhesive layer, and GLb4 as a second adhesive layer, these layers were coextruded using annular dies so that the layer arrangement of the substrate layer/the first adhesive layer/the gas barrier layer/the second adhesive layer/the seal layer was obtained with layer proportions (%) of 22.5/22.5/10.0/22.5/22.5 of the whole, and then quenched and solidified in cold water. As a result, a tubular unoriented film was formed with uniform thickness precision for each layer.

The unoriented film was passed through two pairs of differential nip rolls in a stretching machine under heating conditions, stretched 4 times in MD and 4 times in TD (16 times in area draw ratio) by blowing air into the film, and then subjected to heat treatment to form a laminate film with the laminated layers.

The resulting heat-shrinkable laminate film was determined to have a layer (A) formed by the substrate layer/the first adhesive layer/the gas barrier layer, and a layer (B) formed by the second adhesive layer/the seal layer, and to have an interlayer strength of 0.5 N/15 mm. Table 14 lists the evaluation results of the obtained heat-shrinkable laminate film.

Comparative Example B2

Using a mixture of 97 mass % PPb3 and 3 mass % AFb1 as a substrate layer, a mixture of 97 mass % PEb3 and 3 mass % AFb1 as a seal layer, Ny3 as a gas barrier layer, GLb3 as a first adhesive layer, and GLb4 as a second adhesive layer, a tubular unoriented film was formed with uniform thickness precision for each layer.

The unoriented film was passed through two pairs of differential nip rolls in a stretching machine under heating conditions, stretched 4 times in MD and 4 times in TD (16 times in area draw ratio) by blowing air into the film, and then subjected to heat treatment to form a laminate film.

The resulting heat-shrinkable laminate film was formed by the substrate layer/the first adhesive layer/the gas barrier layer/the second adhesive layer/the seal layer in the stated order. The laminate film was determined to have a layer (A) formed by the substrate layer/the first adhesive layer/the gas barrier layer, and a layer (B) formed by the second adhesive layer/the seal layer, and to have an interlayer strength of 0.5

N/15 mm. Table 14 lists the evaluation results of the obtained heat-shrinkable laminate film.

Comparative Example B3

Using a mixture of 97 mass % PPb4 and 3 mass % AFb1 as a substrate layer, a mixture of 97 mass % PEb4 and 3 mass % AFb1 as a seal layer, Ny1 as a gas barrier layer, GLb2 as a first adhesive layer, and GLb3 as a second adhesive layer, a tubular unoriented film was formed with uniform thickness precision for each layer.

The unoriented film was passed through two pairs of differential nip rolls in a stretching machine under heating conditions, stretched 4 times in MD and 4 times in TD (16 times in area draw ratio) by blowing air into the film, and then subjected to heat treatment to form a laminate film.

The resulting heat-shrinkable laminate film was formed by the substrate layer/the first adhesive layer/the gas barrier layer/the second adhesive layer/the seal layer in the stated order. The laminate film was determined to have a layer (A) formed by the substrate layer/the first adhesive layer, and a layer (B) formed by the gas barrier layer/the second adhesive layer/the seal layer, and to have an interlayer strength of 0.4 N/15 mm. Table 14 lists the evaluation results of the obtained heat-shrinkable laminate film.

Comparative Example B4

Using a mixture of 95 mass % PPb4, 3 mass % AFb1, and 2 mass % AFb2 as a substrate layer, a mixture of 95 mass % PEb4, 3 mass % AFb1, and 2 mass % AFb2 as a seal layer, and Ny1 as a gas barrier layer, a tubular unoriented film was obtained with uniform thickness precision for each layer.

The unoriented film was passed through two pairs of differential nip rolls in a stretching machine under heating conditions, stretched 4 times in MD and 4 times in TD (16 times in area draw ratio) by blowing air into the film, and then subjected to heat treatment to form a laminate film, in which the layers were laminated by a dry lamination method using GLb5 as the adhesive layers.

The resulting heat-shrinkable laminate film was formed by the substrate layer/the first adhesive layer/the gas barrier layer/the second adhesive layer/the seal layer in the stated order. In this case, the layer (A) and the layer (B) could not be peeled away from each other. Table 14 lists the evaluation results of the obtained heat-shrinkable laminate film.

TABLE 9

|  | Ex. B1 | Ex. B2 | Ex. B3 | Ex. B4 | Ex. B5 |
|---|---|---|---|---|---|
| Layer 1 Composition | Substrate Layer PPb1/AFb1 97/3 | Substrate Layer PPb1/AFb1 97/3 | Substrate Layer PPb1/AFb1 97/3 | Substrate Layer PPb2/AFb1 97/3 | Substrate Layer PPb3/AFb1 97/3 |
| Thickness (μm) | 5.8 | 3.8 | 3.8 | 3.8 | 3.8 |
| Layer 2 Composition | Adhesive Layer GLb1 | Adhesive Layer GLb1 | Adhesive Layer GLb3 | Adhesive Layer GLb3 | Adhesive Layer GLb3 |
| Thickness (μm) | 4.6 | 3.0 | 3.0 | 3.0 | 3.0 |
| Layer 3 Composition | Gas Barrier Layer Ny1 | Gas Barrier Layer Ny1 | Gas Barrier Layer Ny1 | Gas Barrier Layer Ny1 | Gas Barrier Layer Ny1 |
| Thickness (μm) | 2.3 | 1.5 | 1.5 | 1.5 | 1.5 |
| Layer 4 Composition | Adhesive Layer GLb2 | Adhesive Layer GLb2 | Adhesive Layer GLb4 | Adhesive Layer GLb4 | Adhesive Layer GLb4 |
| Thickness (μm) | 4.6 | 3.0 | 3.0 | 3.0 | 3.0 |
| Layer 5 Composition | Seal Layer PEb1/AFb1 97/3 | Seal Layer PEb1/AFb1 97/3 | Seal Layer PEb1/AFb1 97/3 | Seal Layer PEb2/AFb1 97/3 | Seal Layer PEb3/AFb1 97/3 |
| Thickness (μm) | 5.8 | 3.8 | 3.8 | 3.8 | 3.8 |
| Total Layer Thickness | 23.0 | 15.0 | 15.0 | 15.0 | 15.0 |
| Layers Coextruded | Layer 1 to Layer 5 | Layer 1 to Layer 5 | Layer 1 to Layer 5 | Layer 1 to Layer 5 | Layer 1 to Layer 5 |

TABLE 10

|  | Ex. B6 | Ex. B7 | Ex. B8 | Ex. B9 | Ex. B10 |
|---|---|---|---|---|---|
| Layer 1 Composition | Substrate Layer PPb4/AFb1 97/3 | Substrate Layer PPb3/AFb1 97/3 | Substrate Layer PPb3/AFb1/AFb2 95/3/2 | Substrate Layer PPb3/AFb1/AFb2 95/3/2 | Substrate Layer PPb3/AFb1/AFb2 95/3/2 |
| Thickness (μm) | 3.8 | 3.8 | 3.8 | 3.8 | 3.8 |
| Layer 2 Composition | Adhesive Layer GLb3 | Adhesive Layer GLb3 | Adhesive Layer GLb3 | Adhesive Layer GLb3 | Adhesive Layer GLb3 |
| Thickness (μm) | 3.0 | 3.0 | 3.0 | 2.4 | 1.4 |
| Layer 3 Composition | Gas Barrier Layer Ny1 | Gas Barrier Layer Ny2 | Gas Barrier Layer Ny1 | Gas Barrier Layer Ny1 | Gas Barrier Layer Ny1 |
| Thickness (μm) | 1.5 | 1.5 | 1.5 | 2.7 | 3.3 |
| Layer 4 Composition | Adhesive Layer GLb4 | Adhesive Layer GLb4 | Adhesive Layer GLb4 | Adhesive Layer GLb4 | Adhesive Layer GLb4 |
| Thickness (μm) | 3.0 | 3.0 | 3.0 | 2.4 | 2.7 |
| Layer 5 Composition | Seal Layer PEb4/AFb1 97/3 | Seal Layer PEb3/AFb1 97/3 | Seal Layer PEb3/AFb1/AFb2 95/3/2 | Seal Layer PEb3/AFb1/AFb2 95/3/2 | Seal Layer PEb3/AFb1/AFb2 95/3/2 |
| Thickness (μm) | 3.8 | 3.8 | 3.8 | 3.8 | 3.8 |
| Total Layer Thickness (μm) | 15.0 | 15.0 | 15.0 | 15.0 | 15.0 |
| Layers Coextruded | Layer 1 to Layer 5 | Layer 1 to Layer 5 | Layer 1 to Layer 5 | Layer 1 to Layer 5 | Layer 1 to Layer 5 |

TABLE 11

|  | Ex. B11 | Ex. B12 | Comp. Ex. B1 | Comp. Ex. B2 | Comp. Ex. B3 | Comp. Ex. B4 |
|---|---|---|---|---|---|---|
| Layer 1 Composition | Substrate Layer PPb4/AFb1/AFb2 95/3/2 | Substrate Layer PPb1/AFb1 97/3 | Substrate Layer PEb3/AFb1 97/3 | Substrate Layer PPb3/AFb1 97/3 | Substrate Layer PPb4/AFb1 97/3 | Substrate Layer PPb4/AFb1/AFb2 95/3/2 |
| Thickness (μm) | 3.8 | 9.0 | 3.8 | 3.8 | 3.8 | 8.9 |
| Layer 2 Composition | Adhesive Layer GLb3 | Gas Barrier Layer Ny1 | Adhesive Layer GLb3 | Adhesive Layer GLb3 | Adhesive Layer GLb2 | Adhesive Layer GLb5 |
| Thickness (μm) | 3.0 | 2.0 | 3.0 | 3.0 | 3.0 | 0.1 |
| Layer 3 Composition | Gas Barrier Layer Ny1 | Seal Layer PEb4/AFb1 97/3 | Gas Barrier Layer Ny1 | Gas Barrier Layer Ny3 | Gas Barrier Layer Ny1 | Gas Barrier Layer Ny1 |
| Thickness (μm) | 1.5 | 29.0 | 1.5 | 1.5 | 1.5 | 2.0 |
| Layer 4 Composition | Adhesive Layer GLb4 | — | Adhesive Layer GLb4 | Adhesive Layer GLb4 | Adhesive Layer GLb3 | Adhesive Layer GLb5 |
| Thickness (μm) | 3.0 | — | 3.0 | 3.0 | 3.0 | 0.1 |
| Layer 5 Composition | Seal Layer PEb4/AFb1/AFb2 95/3/2 | — | Seal Layer PEb3/AFb1 97/3 | Seal Layer PEb3/AFb1 97/3 | Seal Layer PEb4/AFb1 97/3 | Seal Layer PEb4/AFb1/AFb2 95/3/2 |
| Thickness (μm) | 3.8 | — | 3.8 | 3.8 | 3.8 | 8.9 |
| Total Layer Thickness | 15.0 | 40.0 | 15.0 | 15.0 | 15.0 | 20.0 |
| Layers Coextruded | Layer 1 to Layer 5 | Layer 1 to Layer 3 | Layer 1 to Layer 5 | Layer 1 to Layer 5 | Layer 1 to Layer 5 | None |

TABLE 12

|  | Ex. B1 | Ex. B2 | Ex. B3 | Ex. B4 | Ex. B5 |
|---|---|---|---|---|---|
| Oxygen Transmission Rate (cc/m$^2$ · atm · day) | 30 | 40 | 41 | 39 | 40 |
| Layer (A) | Layer 1 to Layer 3 | Layer 1 to Layer 3 | Layer 1 to Layer 3 | Layer 1 to Layer 3 | Layer 1 to Layer 3 |
| Layer (B) | Layer 4 to Layer 5 | Layer 4 to Layer 5 | Layer 4 to Layer 5 | Layer 4 to Layer 5 | Layer 4 to Layer 5 |
| Interlayer Strength (N/15 mm) | 0.3 | 0.3 | 0.4 | 0.4 | 0.4 |
| Melting Point of Substrate Layer − Melting Point of Seal Layer (° C.) | 45 | 45 | 45 | 27 | 24 |
| Melting Point of Second Adhesive Layer − Melting Point of First Adhesive Layer (° C.) | 18 | 18 | 25 | 25 | 25 |
| Heat Shrinkage Rate at 100° C. in MD/TD |  |  |  |  |  |
| Layer (A) (%) | 23/28 | 24/27 | 24/28 | 22/25 | 22/24 |
| Layer (B) (%) | 9/7 | 9/7 | 13/11 | 12/10 | 12/10 |
| Difference (%) | 14/21 | 15/20 | 11/17 | 12/15 | 12/14 |
| Total Layer (%) | 13/15 | 12/14 | 13/15 | 13/15 | 12/15 |
| Heat Shrinkage Rate at 140° C. in MD/TD |  |  |  |  |  |
| Total Layer (%) | 30/32 | 30/33 | 32/38 | 32/36 | 31/35 |
| Heat Shrinkage Rate at 60° C. in MD/TD |  |  |  |  |  |
| Total Layer (%) | 3/1 | 3/1 | 5/2 | 4/3 | 5/3 |
| Evaluation of Heat Sealing Properties | A | A | A | A | A |
| Evaluation of Warpage | B | B | B | A | A |
| Evaluation of Barrier Properties | B | B | A | A | A |
| Evaluation of Anti-fogging Properties | A | A | A | A | A |
| Evaluation of Finished Quality of Package | A | A | A | A | A |

TABLE 13

|  | Ex. B6 | Ex. B7 | Ex. B8 | Ex. B9 | Ex. B10 |
|---|---|---|---|---|---|
| Oxygen Transmission Rate (cc/m$^2$ · atm · day) | 40 | 47 | 33 | 29 | 25 |
| Layer (A) | Layer 1 to Layer 3 | Layer 1 to Layer 3 | Layer 1 to Layer 3 | Layer 1 to Layer 3 | Layer 1 to Layer 3 |
| Layer (B) | Layer 4 to Layer 5 | Layer 4 to Layer 5 | Layer 4 to Layer 5 | Layer 4 to Layer 5 | Layer 4 to Layer 5 |
| Interlayer Strength (N/15 mm) | 0.4 | 0.4 | 0.3 | 0.4 | 0.4 |
| Melting Point of Substrate Layer − Melting Point of Seal Layer (° C.) | 49 | 24 | 24 | 24 | 24 |

TABLE 13-continued

|  | Ex. B6 | Ex. B7 | Ex. B8 | Ex. B9 | Ex. B10 |
|---|---|---|---|---|---|
| Melting Point of First Adhesive Layer − Melting Point of Second Adhesive Layer (° C.) | 25 | 25 | 25 | 25 | 25 |
| Heat Shrinkage Rate at 100° C. in MD/TD |  |  |  |  |  |
| Layer (A) (%) | 24/29 | 23/24 | 22/24 | 22/24 | 22/24 |
| Layer (B) (%) | 12/10 | 12/10 | 11/10 | 12/13 | 10/12 |
| Difference (%) | 12/19 | 11/14 | 11/14 | 10/11 | 12/12 |
| Total Layer (%) | 13/11 | 12/13 | 14/16 | 12/15 | 13/11 |
| Heat Shrinkage Rate at 140° C. in MD/TD |  |  |  |  |  |
| Total Layer (%) | 28/32 | 30/33 | 31/32 | 30/30 | 28/30 |
| Heat Shrinkage Rate at 60° C. in MD/TD |  |  |  |  |  |
| Total Layer (%) | 3/3 | 3/2 | 3/3 | 3/3 | 5/2 |
| Evaluation of Heat Sealing Properties | A | A | A | A | A |
| Evaluation of Warpage | B | A | A | A | A |
| Evaluation of Barrier Properties | A | A | A | A | A |
| Evaluation of Anti-fogging Properties | A | A | A | A | A |
| Evaluation of Finished Quality of Package | B | A | A | A | B |

TABLE 14

|  | Ex. B11 | Ex. B12 | Comp. Ex. B1 | Comp. Ex. B2 | Comp. Ex. B3 | Comp. Ex. B4 |
|---|---|---|---|---|---|---|
| Oxygen Transmission Rate (cc/m² · atm · day) | 40 | 20 | 36 | 124 | 41 | 30 |
| Layer (A) | Layer 1 to Layer 3 | Layer 1 | Layer 1 to Layer 3 | Layer 1 to Layer 3 | Layer 1 to Layer 2 | unpeelable |
| Layer (B) | Layer 4 to Layer 5 | Layer 2 to Layer 3 | Layer 4 to Layer 5 | Layer 4 to Layer 5 | Layer 3 to Layer 5 | unpeelable |
| Interlayer Strength (N/15 mm) | 0.4 | 0.1 | 0.5 | 0.5 | 0.4 | unpeelable |
| Melting Point of Substrate Layer − Melting Point of Seal Layer (° C.) | 49 | 33 | 0 | 24 | 49 | 41 |
| Melting Point of First Adhesive Layer − Melting Point of Second Adhesive Layer (° C.) | 25 | — | 25 | 25 | −40 | 0 |
| Heat Shrinkage Rate at 100° C. in MD/TD |  |  |  |  |  |  |
| Layer (A) (%) | 24/29 | 11/13 | 23/22 | 22/24 | 31/32 | unpeelable |
| Layer (B) (%) | 9/10 | 5/4 | 10/11 | 12/13 | 9/10 | unpeelable |
| Difference (%) | 15/19 | 6/8 | 13/11 | 10/11 | 22/22 | unpeelable |
| Total Layer (%) | 11/13 | 7/6 | 10/12 | 12/13 | 12/14 | 12/10 |
| Heat Shrinkage Rate at 140° C. in MD/TD |  |  |  |  |  |  |
| Total Layer (%) | 29/30 | 15/18 | 32/34 | 31/32 | 30/32 | 26/28 |
| Heat Shrinkage Rate at 60° C. in MD/TD |  |  |  |  |  |  |
| Total Layer (%) | 4/2 | 0/1 | 6/5 | 5/3 | 7/5 | 3/2 |
| Evaluation of Heat Sealing Properties | A | B | D | A | A | A |
| Evaluation of Warpage | B | B | A | A | D | B |
| Evaluation of Barrier Properties | A | A | A | D | A | A |
| Evaluation of Anti-fogging Properties | A | A | A | A | A | D |
| Evaluation of Finished Quality of Package | B | B | A | A | A | B |

It can be seen from the results above that the heat-shrinkable laminate films obtained in Examples B1 to B12 also exhibit good sealing properties and reduced warpage, have excellent anti-fogging properties, and provide well-finished packages.

In contrast, it can be seen from the results above that the heat-shrinkable laminate film obtained in Comparative Example B1 is susceptible to seal failures during heat sealing, and is not suitable for packaging applications. It is appreciated that the film obtained in Comparative Example B2 has poor barrier properties, and is not suitable for packaging applications. It is further appreciated that the heat-shrinkable laminate film obtained in Comparative Example B3 is unfavorable for handling during the packaging process due to the occurrence of a warpage, and is not suitable for packaging applications. It is further appreciated that the film obtained in Comparative Example B4 exhibits poor anti-fogging properties since it is formed by a lamination method, and is not suitable for packaging applications.

INDUSTRIAL APPLICABILITY

Our heat-shrinkable laminate films offer stable heat sealing properties, less susceptibility to warpage, and excellent barrier properties. Therefore, our heat-shrinkable laminate films are suitable for gas pack packaging for long-term storage and room-temperature storage of food products and the like.

The invention claimed is:

1. A heat-shrinkable laminate film comprising a layer (A) and a layer (B) laminated via an interface having an interlayer strength of 0.5 N/15 mm or lower, wherein the layer (A) comprises at least a substrate layer containing a polypropylene-based resin, the layer (B) comprises at least a seal layer containing a polyethylene-base resin, and any of the following conditions (1) and (2) is satisfied:

(1) the difference in heat shrinkage rate between the layer (A) and the layer (B), when peeled at the interface, either in machine direction (MD) or transverse direction (TD), is 10% or less at 100° C., and the heat-shrinkable laminate film comprises a gas barrier layer containing a saponified ethylene-vinyl alcohol copolymer and has an oxygen transmission rate of 60 cc/m²·day·atm or lower at 23° C., 65% RH; and (2) the difference in heat shrinkage rate between the layer (A) and the layer (B), when peeled at the interface, either in machine direction (MD) or transverse direction (TD), is 20% or less at 100° C., and the heat-shrinkable laminate film comprises a gas barrier layer containing an aromatic polyamide-based copolymer and has an oxygen transmission rate of 60 cc/m²·day·atm or lower at 23° C., 65% RH.

2. The heat-shrinkable laminate film according to claim 1, wherein the heat-shrinkable laminate film comprises a gas barrier layer containing an aromatic polyamide copolymer, and has a total-layer heat shrinkage rate in the machine direction of 20% or more at 140° C.

3. The heat-shrinkable laminate film according to claim 1, wherein the substrate layer, a first adhesive layer containing a modified polyolefin-based resin, a gas barrier layer containing an aromatic polyamide-based copolymer, a second adhesive layer containing a modified polyolefin-based resin, and the seal layer are laminated in the stated order, and either an interface between the first adhesive layer and the gas barrier layer, or an interface between the gas barrier layer and the second adhesive layer has an interlayer strength of 0.5 N/15 mm or lower.

4. The heat-shrinkable laminate film according to claim 1, wherein the second adhesive layer has a melting point higher than that of the first adhesive layer by 15° C. or more.

5. The heat-shrinkable laminate film according to claim 1, wherein the heat-shrinkable laminate film comprises a gas barrier layer containing a saponified ethylene-vinyl alcohol copolymer, and has a total-layer heat shrinkage rate in the machine direction of 30% or more at 100° C.

6. The heat-shrinkable laminate film according to claim 1, wherein the substrate layer, a first adhesive layer containing a modified polyolefin-based resin, a gas barrier layer containing a saponified ethylene-vinyl alcohol copolymer, a second adhesive layer containing a modified polyolefin-based resin, and the seal layer are laminated in the stated order, and either an interface between the first adhesive layer and the gas barrier layer, or an interface between the gas barrier layer and the second adhesive layer has an interlayer strength of 0.5 N/15 mm or lower.

7. The heat-shrinkable laminate film according to claim 1, wherein the first adhesive layer has a melting point equal to or lower than that of the second adhesive layer.

8. The heat-shrinkable laminate film according to claim 1, wherein each of the resins other than the gas barrier layer has a melting point of 170° C. or lower.

9. The heat-shrinkable laminate film according to claim 1, wherein the difference in highest melting point between the resin making the substrate layer and the resin making the seal layer is 30° C. or less.

10. The heat-shrinkable laminate film according to claim 1, wherein the heat-shrinkable laminate film has a total-layer heat shrinkage rate in the transverse direction of 5% or less at 60° C.

11. The heat-shrinkable laminate film according to claim 1, wherein the heat-shrinkable laminate film has a total layer thickness of 25 µm or less.

12. The heat-shrinkable laminate film according to claim 1, wherein the heat-shrinkable laminate film has 5-mm or less warpage when allowed to stand for 1 hour at 23° C., 50% RH.

* * * * *